(12) United States Patent
Gossman

(10) Patent No.: US 8,980,205 B1
(45) Date of Patent: Mar. 17, 2015

(54) METHOD FOR REDUCING THE MERCURY (HG) AND OTHER METAL EMISSIONS FROM A PLANT FOR MANUFACTURING CEMENT CLINKER AND OTHER INDUSTRIAL PROCESSES

(71) Applicant: David G. Gossman, Zwingle, IA (US)

(72) Inventor: David G. Gossman, Zwingle, IA (US)

( * ) Notice: Subject to any disclaimer, the term of this patent is extended or adjusted under 35 U.S.C. 154(b) by 0 days.

(21) Appl. No.: 14/032,321

(22) Filed: Sep. 20, 2013

(51) Int. Cl.
*B01D 53/64* (2006.01)

(52) U.S. Cl.
CPC ..................... *B01D 53/64* (2013.01)
USPC ............. 423/210; 106/761; 106/762

(58) Field of Classification Search
CPC ................. B01D 53/64; B01D 53/0233
USPC ................. 423/210; 106/761, 762
See application file for complete search history.

(56) References Cited

U.S. PATENT DOCUMENTS

| 7,914,757 B1* | 3/2011 | Bonmann | 423/210 |
| 2002/0114750 A1* | 8/2002 | Holste et al. | 423/210 |
| 2007/0104631 A1* | 5/2007 | Durante et al. | 423/210 |
| 2013/0202504 A1* | 8/2013 | Pollack | 423/210 |

* cited by examiner

*Primary Examiner* — Timothy Vanoy
(74) *Attorney, Agent, or Firm* — Robert W Strozier

(57) ABSTRACT

A method and plant for reducing mercury (Hg) and other metal emissions including injecting a chemical reagent into the process in such a way as to convert elemental mercury into a mercury compound that is more readily captured using normal particulate control equipment associated with kilns, smelters, furnaces, and boilers of cement plants and other industrial plants.

21 Claims, 1 Drawing Sheet

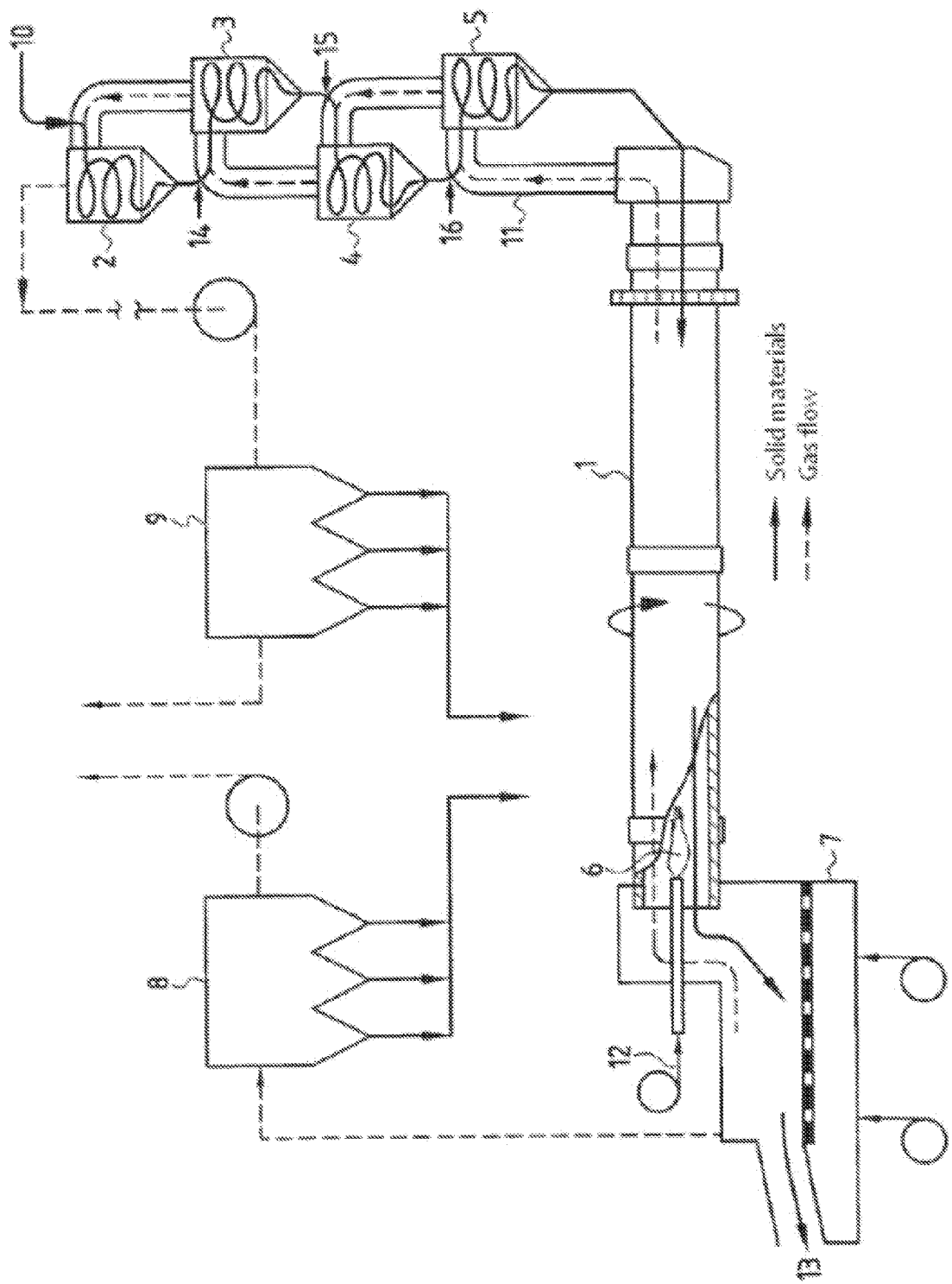

METHOD FOR REDUCING THE MERCURY (HG) AND OTHER METAL EMISSIONS FROM A PLANT FOR MANUFACTURING CEMENT CLINKER AND OTHER INDUSTRIAL PROCESSES

BACKGROUND OF THE INVENTION

1. Field of the Invention

Embodiments of the present invention relates to methods for reducing the mercury (Hg) (and other metal) emissions from a plant for manufacturing cement clinker, where cement raw meal is preheated and burned in a kiln subsystem comprising a cyclone preheater and a kiln and where one or a plurality of sulfur generating, producing or donating reagents are introduced into the kiln subsystem to convert volatile heavy metals such as mercury into solid metal sulfide such as mercury sulfides. The invention also relates to a plants for carrying out the methods.

2. Description of the Related Art

Plants for manufacturing cement clinker are generally known from the literature.

The emission of mercury (Hg) from modern cement systems for manufacturing cement clinker is highly variable due to the fact that the mercury contained in the fuel and raw materials for the cement systems especially for the kiln subsystem and for any combustor or calciner is variable in concentration. Additionally, Hg can be in both elemental and oxidized forms after being subjected to the temperatures and chemical reactions inside the kiln subsystem. However, traditional particulate removal system do not adequately remove elemental Hg.

Thus, there is a need in the art for new method and combustion system that are more cost effective and more effective in reducing mercury emissions.

SUMMARY OF THE INVENTION

Embodiments of the present invention provide methods characterized in that one or a plurality of sulfur generating or producing reagents selected from the group consisting of metal sulfide compounds, organic sulfide compounds, and/or mixtures of metal sulfur compounds and organic sulfide compounds are injected or introduced into a combustor or a kiln subsystem at an elevated temperature sufficient to decompose the sulfur generating or producing reagents into elemental sulfur. Alternatively, the sulfur generating or producing reagents may be transferring elemental sulfur to metals such as mercury at the elevated temperature. Thus, the exact mechanism by which the sulfide moieties are transferred from the sulfide donors to the sulfide acceptors is not critical. All that is required of the sulfur generating, producing or donating reagents is that they are capable to converting metals such as mercury or other heavy metals into their corresponding sulfides. Once injected or introduced, the sulfur generating or producing reagent decomposes releasing elemental sulfur at the elevated temperature producing elemental sulfur, which then reacts with elemental mercury forming mercury sulfide. Mercury sulfide is a form of mercury that may be readily captured using standard particulate control technologies such as bag houses or electrostatic precipitators; thus, allowing an effective reduction of mercury emissions from the combustors or cement kiln subsystems. In certain embodiments, the elevated temperatures is in a range between about 400° C. and about 600° C. In other embodiments, the sulfur generating or producing reagents are injected at least into a preheater of a kiln subsystem.

Embodiments of this invention provide combustion systems including a reagent injection subsystem for introducing or injecting a sulfur generating or producing reagent into a portion of the systems having a temperature between about 400° C. and about 600° C.

BRIEF DESCRIPTION OF THE DRAWINGS

The invention can be better understood with reference to the following detailed description together with the appended illustrative drawings in which like elements are numbered the same:

FIG. 1 illustrates a method and plant for producing cement clinker having reduced mercury emissions.

DETAILED DESCRIPTION OF THE INVENTION

The inventor has found that methods and systems may be constructed that reduce heavy metal emissions such as mercury emissions from combustors including cement kilns. The methods and systems involve introducing a sulfur generating or producing reagent into a zone of the combustor having an elevated temperature sufficient to decompose the sulfur generating or producing reagent into elemental sulfur, which is then available to react with elemental heavy metals such as mercury to form metal sulfides reducing emissions of elemental heavy metals. Metal sulfides such as mercury sulfide are then capable of being captured by particulate emission control systems. Elemental mercury has too high a vapor pressure to allow much to be captured in normal particulate control systems, but mercury sulfide has sufficient thermal stability to be amenable to recovery in a particulate emission control system as illustrated below:

| Compound | Mercury | Mercuric chloride | Mercuric oxide | Mercuric sulfide |
|---|---|---|---|---|
| Formula | Hg | $HgCl_2$ | HgO | HgS |
| Melting Point (° C.) | −39 | 276 | 500 (decomposes) | 584 (sublimes) |
| Boiling Point (° C.) | 357 | 302 | N/A | N/A |

The introduction of selected sulfur generating or producing reagents into the combustion process at a proper location and at a corresponding temperature causes elemental mercury to be converted to an oxidized form such as mercury sulfide. An example of such a sulfur generating or producing reagent is ferric disulfide ($FeS_2$) also referred to as pyrite or marcasite.

The reason for this is that iron sulfide ($FeS_2$) undergoes desulfurization over a range of temperatures from 100° C. to 600° C. according to the equation:

$$FeS_2 \rightarrow Fe + S\uparrow$$

where after the evaporated elemental sulfur is available to react with the elemental mercury forming HgS.

Additional characteristics of the plant will be apparent from the detailed description provided in the attached figure.

The sulfur generating or producing reagent may be introduced into the preheater with the raw materials so long as it is not a gas. However, in certain embodiments, the sulfur generating or producing reagent is introduced separately. In other embodiments, the emissions may be monitored with a continuous mercury emissions monitor so that the amount of sulfur generating or producing reagent injected and point of injection may be fine-tuned for the emission control systems to optimize the conversion of the sulfur generating or producing reagent into elemental sulfur that is then available to react with the mercury and in turn optimize the reaction of mercury with elemental sulfur to mercury sulfide.

Various sulfur compounds including elemental sulfur ($S_8$) may be used as the sulfur generating or producing reagent. The point of injection of the sulfur generating or producing reagent needs to be adjusted based on the sulfur generating or producing reagent's chemical properties relative to thermal decomposition and vaporization. Exemplary sulfur generating or producing reagents include elemental sulfur, iron sulfide including $FeS_2$, nickel sulfides, copper sulfides, cobalt sulfides, manganese sulfides, zinc sulfides, or mixtures and combinations thereof.

In addition to mercury, other metal emissions may be controlled for those metals that form non-volatile metal sulfides. Examples include cadmium (Cd) and lead (Pb).

It can be seen by anyone skilled in the art that this same emission control technique may be applied to other processes. Lime kilns, other industrial kilns, smelters, other industrial furnaces and industrial boilers would be examples.

DETAILED DESCRIPTION OF THE DRAWINGS

In the FIG. 1 is seen a cement manufacturing plant comprising a rotary kiln 1, and cyclones 2, 3, 4 and 5. The plant further comprises a clinker cooler 7 for cooling of burned cement clinker. Raw material is introduced into an exhaust gas duct 10, which connects the two uppermost cyclones 2, 3 of the preheater and it is preheated in counter flow to the exhaust gas on its passage through the cyclones. From the bottom outlet of the cyclone 5, the calcined raw material is routed to the rotary kiln 1. The exhaust gas from the rotary kiln 1 flows through the cyclone 5 and up through the preheater by means of a fan to a particulate filter 9. Coal is injected into the kiln 1 with air from a blower 12 through a burner 6. Cooling gases from the clinker cooler 7 are used as combustion gas in the kiln 1 and a portion are exhausted through a particulate filter 8. Cooled clinker exits the clinker cooler at an outlet 13. Hot combustion gases exit the kiln 1 and travel to the cyclone 5 via duct 11.

According to the invention, a sulfur generating or producing reagent is supplied in the form of ferric disulfide and/or similar compounds including elemental sulfur and hydrogen sulfide into the preheater at a suitable point in the temperature profile of the system. The sulfur generating or producing reagent may be separately supplied into exhaust gas duct via an opening 14, 15 or 16. Optionally, the sulfur generating or producing reagent is supplied to the exhaust duct 10 with the raw materials and the sulfur generating or producing reagent (solid and liquid reagents only) is thereby supplied to the preheater intermingled with the raw materials.

Subsequently, the sulfur generating or producing reagent will be carried, together with the raw materials, down through the preheater 1. In the preheater the sulfur generating or producing reagent will thermally decompose releasing gaseous elemental sulfur which is then available to react with elemental mercury. The formed HgS will then condense into a particulate, as well as sorb onto other particulates, and be captured with the particulate control system 9.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

I claim:

1. A method for reducing the mercury emission from a plant for manufacturing cement clinker by which cement raw meal is preheated and burned in the plant comprising a cyclone preheater and a kiln in communication with the cyclone preheater, the method comprising:
   introducing a sulfur generating or producing reagent into an uppermost or other cyclone stage of the cyclone preheater, the sulfur generating or producing reagent comprising at least one of a sulfide compound or elemental sulfur ($S_8$), and the sulfur generating or producing reagent being present in solid or liquid form that thermally decomposes and vaporizes at a suitable temperature in the kiln;
   reacting with elemental mercury to form mercury sulfide; and
   allowing the mercury sulfide to be readily captured in particulate air pollution control equipment.

2. The method according to claim 1, wherein the sulfur generating or producing reagent is mixed with raw materials to form a mixture of the sulfur generating or producing reagent and raw materials, and introducing the mixture of sulfur generating or producing reagent and raw materials into the cyclone preheater.

3. The method according to claim 2, wherein the sulfur generating or producing reagent and raw materials are mixed in a raw mill plant that is in communication with the preheater.

4. The method according to claim 1, wherein the sulfur generating or producing reagent comprises $FeS_2$, elemental sulfur or other sulfur bearing compounds that will thermally decompose and release sulfur in its vapor state.

5. The method according to claim 4, further comprising:
   reacting with elemental cadmium and elemental lead to form cadmium sulfide and lead sulfide; and
   allowing the cadmium sulfide and lead sulfide to be readily captured in particulate air pollution control equipment.

6. The method according to claim 1, wherein the sulfur generating or producing reagent is separately introduced into the cyclone preheater.

7. The method according to claim 1, wherein the plant has a particulate emission control system.

8. A method for reducing the mercury emission from a plant for manufacturing cement clinker by which cement raw meal is preheated and burned in the plant comprising a straight kiln, the method comprising:
   introducing a sulfur generating or producing reagent into the back end of the kiln, the sulfur generating or producing reagent comprising at least one of a sulfide compound or elemental sulfur ($S_8$), and the sulfur generating or producing reagent being present in solid or liquid form that thermally decomposes and vaporizes at a suitable temperature in the kiln;
   reacting with elemental mercury to form mercury sulfide; and
   allowing the mercury sulfide to be readily captured in particulate air pollution control equipment.

9. The method according to claim 8, wherein the sulfur generating or producing reagent is mixed with raw materials to form a mixture of sulfur generating or producing reagents and raw materials, and introducing the mixture of sulfur generating or producing reagents and raw materials into the back end of the kiln system.

10. The method according to claim 8, wherein the sulfur generating or producing reagent and raw materials are mixed in a raw mill plant that provide raw material to the kiln system.

11. The method according to claim 8, wherein the sulfur generating or producing reagent comprises $FeS_2$, elemental sulfur ($S_8$) or other sulfur bearing compounds that will thermally decompose and release sulfur in its vapor state.

12. The method according to claim 8, wherein the reagent is separately introduced into the back end of the kiln system.

13. The method according to claim 8, wherein the sulfur generating or producing reagent is separately introduced using a mid-kiln injection system.

14. The method according to claim 8, wherein the plant has a particulate emission control system.

15. The method according to claim 8, further comprising:
  reacting with elemental cadmium and elemental lead to form cadmium sulfide and lead sulfide; and
  allowing the cadmium sulfide and lead sulfide to be readily captured in particulate air pollution control equipment.

16. A method for reducing the mercury emission from an industrial plant that combusts fuels, the method comprising:
  introducing a sulfur generating or producing reagent into the post combustion gasses, the reagent consisting essentially of a sulfide compound, and the reagent being present in solid or liquid form that thermally decomposes and vaporizes at a suitable temperature in the process to form gaseous elemental sulfur;
  reacting with elemental mercury to form mercury sulfide; and
  allowing the mercury sulfide to be readily captured in particulate air pollution control equipment.

17. The method according to claim 16, wherein the sulfur generating or producing reagent is mixed with raw materials to form a mixture of sulfur generating or producing reagents and raw materials, and introducing the mixture of sulfur generating or producing reagents and raw materials into the system.

18. The method according to claim 17, wherein the sulfur generating or producing reagent and raw materials are mixed in a raw mill plant that is in communication with the process.

19. The method according to claim 16, further comprising:
  reacting with elemental cadmium and elemental lead to form cadmium sulfide and lead sulfide; and
  allowing the cadmium sulfide and lead sulfide to be readily captured in particulate air pollution control equipment.

20. The method according to claim 16, wherein the reagent is separately introduced into the process.

21. The method according to claim 16, wherein the plant has a particulate emission control system.

* * * * *